March 16, 1937.  P. KEMPE  2,074,057
FISHHOOK RELEASE
Filed Aug. 6, 1936
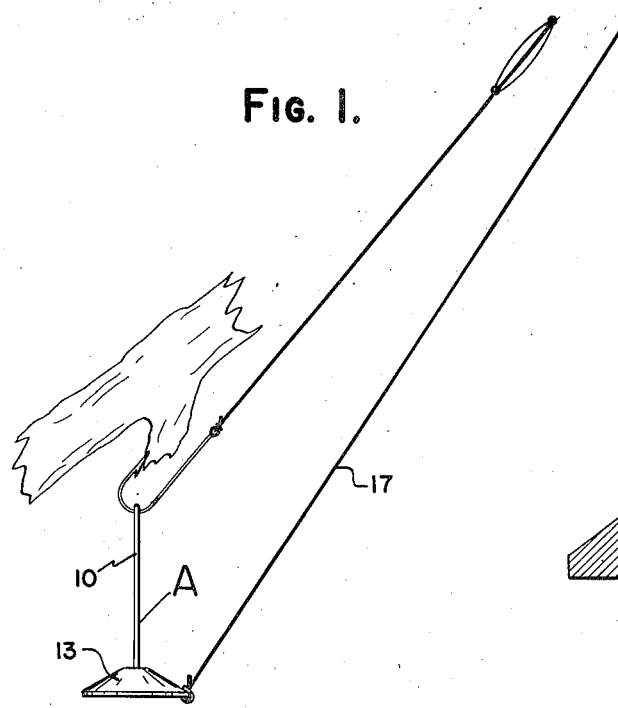
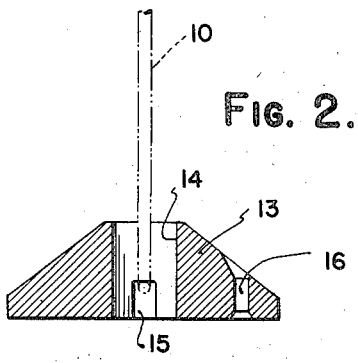
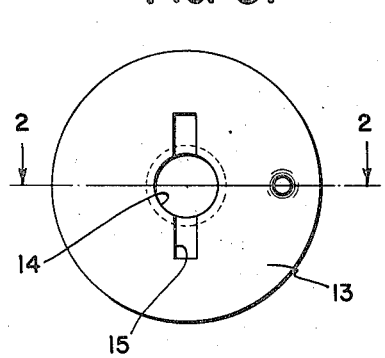
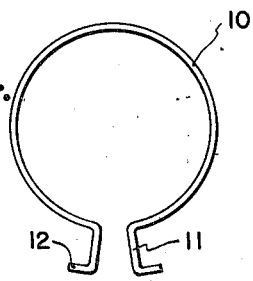
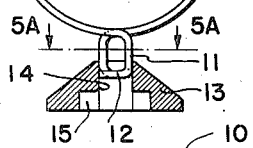
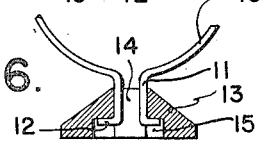
INVENTOR
PAUL KEMPE
BY
ATTORNEYS Patented Mar. 16, 1937

2,074,057

UNITED STATES PATENT OFFICE 2,074,057

FISHHOOK RELEASE

Paul Kempe, Milwaukee, Wis.

Application August 6, 1936, Serial No. 94,611

1 Claim. (Cl. 43—30)

This invention appertains to fishing, and more particularly to a novel appliance for quickly releasing a fish hook from a submerged obstruction when the hook has become snagged therein.

One of the primary objects of my invention is to provide a fishing appliance embodying a weight which can be quickly and conveniently applied to a fishing line without injury thereto, for sliding down said line to the hook to detach the hook from any obstruction, such as weeds, sunken tree limbs, stumps, etc.

Another salient object of my invention is to provide a fish hook releasing device embodying an open eye for detachable connection with a fishing line and for sliding over appliances on the line, such as a sinker, with a novel means for releasably connecting the ends of the eye with a weight.

A further important object of my invention is the provision of a resilient open eye having radially extending fingers on its terminals and laterally extending feet, with a weight having an axial bore for receiving the fingers when the ring is compressed, and notches in the wall of the bore for receiving the feet when the ring is partially expanded, whereby the ring and the weight can be quickly connected together and held against accidental displacement, one from the other.

A still further object of my invention is the provision of a device for releasing hooks from submerged objects, which is of an exceptionally simple and durable character, and which can be manufactured and placed upon the market at a low cost.

With these and other objects in view, the invention consists in the novel construction, arrangement, and formation of parts, as will be hereinafter more specifically described, claimed, and illustrated in the accompanying drawing, in which drawing:

Figure 1 is a side elevation of my improved appliance showing the same in use for dislodging a hook from an obstruction.

Figure 2 is an enlarged central section through the weight portion of the hook releasing device, the eye being shown in dotted lines.

Figure 3 is a bottom plan view of the weight.

Figure 4 is a side elevation of the open eye, the view being taken on a smaller scale than Figures 2 and 3.

Figure 5 is a detail central section through the weight, illustrating the manner of connecting or disconnecting the eye to the weight.

Figure 5A is a detail section view taken on the line 5A—5A of Figure 5.

Figure 6 is a view similar to Figure 5, showing the eye connected with the weight.

Referring to the drawing in detail, wherein similar reference characters designate corresponding parts throughout the several views, the letter A generally indicates my improved fish hook releasing appliance.

The appliance A embodies an enlarged resilient open ring 10, which is preferably formed from a length of round wire. The terminals of the eye 10 have formed thereon outwardly extending, substantially radially disposed fingers 11. These fingers in turn have formed thereon laterally extending oppositely disposed feet 12. The eye 10 is adapted to be detachably connected with a weight 13, which can be formed from lead or any other suitable material possessing the desired mass.

As illustrated, the weight 13 is of a substantially frusto-conical shape and is provided with an axial bore 14. The wall of the bore at diametrically opposed points has formed therein notches 15. An opening 16 is formed in the weight 13 at one side of the bore 14 for the reception of a retrieving line 17. The ends of the openings 16 are preferably flared to facilitate the threading of the line 17 therethrough.

When it is desired to associate the eye 10 with the weight, the eye is compressed, so as to bring the legs or fingers 11 in overlapping relation, at which time the legs and feet 12 can be readily inserted in the bore 14.

When the feet or fingers 12 reach the notches 15 the eye is released, so that the feet or fingers 12 can ride into the said notches. Due to the resiliency of the eye 10, the fingers or feet 12 will be held in the notches, and the weight and the eye will be firmly connected together against accidental displacement. Obviously, by this arrangement the weight and the eye can be instantly connected together or disconnected.

When a fish hook becomes entangled in an obstruction the eye 10 is disconnected from the weight and the eye is placed over the fishing line, after which the weight is connected to the eye. The weight and the eye are now permitted to slide down the fish line, and as the weight and eye strike the hook, the same will effectively dislodge the barb of the hook from the obstruction and carry the hook away from the obstruction. As the weight is provided with the retrieving line 17, the fishing line with its hook and the weight can be readily brought into the shore or into a boat.

Changes in details may be made without departing from the spirit or scope of my invention, but what I claim as new is:

A device for releasing fish hooks from submerged obstructions comprising, a resilient open eye having radially extending legs and laterally extending feet on the terminals of the legs, and a weight provided with an axial bore for receiving the legs when the ring is compressed, and notches in the wall of the bore for receiving the feet when the eye is expanded, said weight having a retrieving line opening therein at one side of the bore.

PAUL KEMPE.